US012388178B2

(12) United States Patent
Chen et al.

(10) Patent No.: US 12,388,178 B2
(45) Date of Patent: Aug. 12, 2025

(54) ANTENNA STRUCTURE

(71) Applicant: Wistron NeWeb Corp., Hsinchu (TW)

(72) Inventors: Po-Yen Chen, Hsinchu (TW); Kuan-Hung Li, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 45 days.

(21) Appl. No.: 18/488,371

(22) Filed: Oct. 17, 2023

(65) Prior Publication Data

US 2024/0047873 A1 Feb. 8, 2024

Related U.S. Application Data

(62) Division of application No. 17/370,181, filed on Jul. 8, 2021, now Pat. No. 11,831,086.

(30) Foreign Application Priority Data

Oct. 27, 2020 (TW) ................................ 109137217

(51) Int. Cl.
*H01Q 5/364* (2015.01)
*H01Q 1/48* (2006.01)
(Continued)

(52) U.S. Cl.
CPC ................. *H01Q 5/10* (2015.01); *H01Q 1/48* (2013.01); *H01Q 5/364* (2015.01); *H01Q 9/42* (2013.01); *H01Q 13/10* (2013.01)

(58) Field of Classification Search
CPC ............ H01Q 5/10; H01Q 1/48; H01Q 5/364; H01Q 9/42; H01Q 13/10; H01Q 1/2291; H01Q 1/243
See application file for complete search history.

(56) References Cited

U.S. PATENT DOCUMENTS 5,714,959 A * 2/1998 Troy .................... H01Q 1/1285 343/715
8,174,457 B1 * 5/2012 Lam ......................... H01Q 9/42 343/846
(Continued)

FOREIGN PATENT DOCUMENTS

CN 111326858 A 6/2020
CN 111697317 A 9/2020
(Continued)

*Primary Examiner* — Dameon E Levi
*Assistant Examiner* — Jordan E. DeWitt
(74) *Attorney, Agent, or Firm* — McClure, Qualey & Rodack, LLP

(57) ABSTRACT

An antenna structure includes a metal mechanism element, a ground element, a feeding radiation element, and a dielectric substrate. The metal mechanism element has a slot. The ground element is coupled to the metal mechanism element. The feeding radiation element has a feeding point. The feeding radiation element is coupled to the ground element. The dielectric substrate has a first surface and a second surface which are opposite to each other. The feeding radiation element is disposed on the first surface of the dielectric substrate. The second surface of the dielectric substrate is adjacent to the metal mechanism element. The slot of the metal mechanism element is excited to generate a first frequency band and a second frequency band. The feeding radiation element is excited to generate a third frequency band. The ground element further includes a first protruding portion and a second protruding portion.

10 Claims, 6 Drawing Sheets

(51) Int. Cl.

| | |
|---|---|
| ***H01Q 5/10*** | (2015.01) |
| ***H01Q 9/42*** | (2006.01) |
| ***H01Q 13/10*** | (2006.01) |

(56) References Cited

U.S. PATENT DOCUMENTS

| | | | | |
|---|---|---|---|---|
| 9,929,473 | B2 | 3/2018 | Huang et al. | |
| 9,985,355 | B2 * | 5/2018 | Wu | H01Q 1/50 |
| 10,644,407 | B2 | 5/2020 | Wu et al. | |
| 10,971,807 | B2 | 4/2021 | Tseng et al. | |
| 11,831,086 | B2 * | 11/2023 | Chen | H01Q 13/10 |
| 2008/0030405 | A1 * | 2/2008 | Tsai | H01Q 5/371 343/700 MS |
| 2008/0180330 | A1 * | 7/2008 | Wei-Shan | H01Q 5/371 343/700 MS |
| 2008/0258979 | A1 * | 10/2008 | Lin | H01Q 1/38 343/700 MS |
| 2008/0258992 | A1 * | 10/2008 | Tsai | H01Q 21/28 343/853 |
| 2009/0058735 | A1 | 3/2009 | Hill et al. | |
| 2014/0104134 | A1 * | 4/2014 | Chen | H01Q 9/145 343/876 |
| 2015/0061951 | A1 * | 3/2015 | Wong | H01Q 5/314 343/749 |
| 2017/0033467 | A1 * | 2/2017 | Huang | H01Q 5/357 |
| 2017/0207542 | A1 * | 7/2017 | Tseng | H01Q 1/48 |
| 2017/0309993 | A1 * | 10/2017 | Tu | H01Q 13/10 |
| 2017/0350830 | A1 * | 12/2017 | Karimi | G01N 33/2823 |
| 2018/0048076 | A1 | 2/2018 | Wei | |
| 2018/0342809 | A1 | 11/2018 | Wu et al. | |
| 2019/0027810 | A1 | 1/2019 | Li et al. | |
| 2019/0027811 | A1 | 1/2019 | Chen et al. | |
| 2020/0091595 | A1 * | 3/2020 | Lee | H01Q 1/22 |
| 2020/0112080 | A1 | 4/2020 | Wu et al. | |
| 2020/0274231 | A1 * | 8/2020 | Wei | H01Q 5/364 |
| 2022/0123463 | A1 * | 4/2022 | Chang | H01Q 1/243 |
| 2024/0291150 | A1 * | 8/2024 | Lee | H01Q 5/40 |

FOREIGN PATENT DOCUMENTS

| | | | |
|---|---|---|---|
| CN | 111786134 | A | 10/2020 |
| TW | 201705610 | A | 2/2017 |

* cited by examiner

ANTENNA STRUCTURE

CROSS REFERENCE TO RELATED APPLICATIONS

This application is a Divisional Application of U.S. patent application Ser. No. 17/370,181 filed on Jul. 8, 2021 (now U.S. Pat. No. 11,831,086), which claims priority to Taiwan Patent Application No. 109137217 filed on Oct. 27, 2020, the entirety of which are incorporated by reference herein.

BACKGROUND OF THE INVENTION

Field of the Invention

The disclosure generally relates to an antenna structure, and more particularly, it relates to a multiband antenna structure.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Antennas are indispensable elements for wireless communication. If an antenna used for signal reception and transmission has insufficient bandwidth, the communication quality of the mobile device will suffer. Accordingly, it has become a critical challenge for antenna designers to design a small wideband antenna element.

BRIEF SUMMARY OF THE INVENTION

In an exemplary embodiment, the disclosure is directed to an antenna structure that includes a metal mechanism element, a ground element, a feeding radiation element, and a dielectric substrate. The metal mechanism element has a slot. The slot has a first closed end and a second closed end. The ground element is coupled to the metal mechanism element. The feeding radiation element has a feeding point. The feeding radiation element is coupled to the ground element. The dielectric substrate has a first surface and a second surface which are opposite to each other. The feeding radiation element is disposed on the first surface of the dielectric substrate. The second surface of the dielectric substrate is adjacent to the metal mechanism element. The slot of the metal mechanism element is excited to generate a first frequency band and a second frequency band. The feeding radiation element is excited to generate a third frequency band. The ground element further includes a first protruding portion and a second protruding portion.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
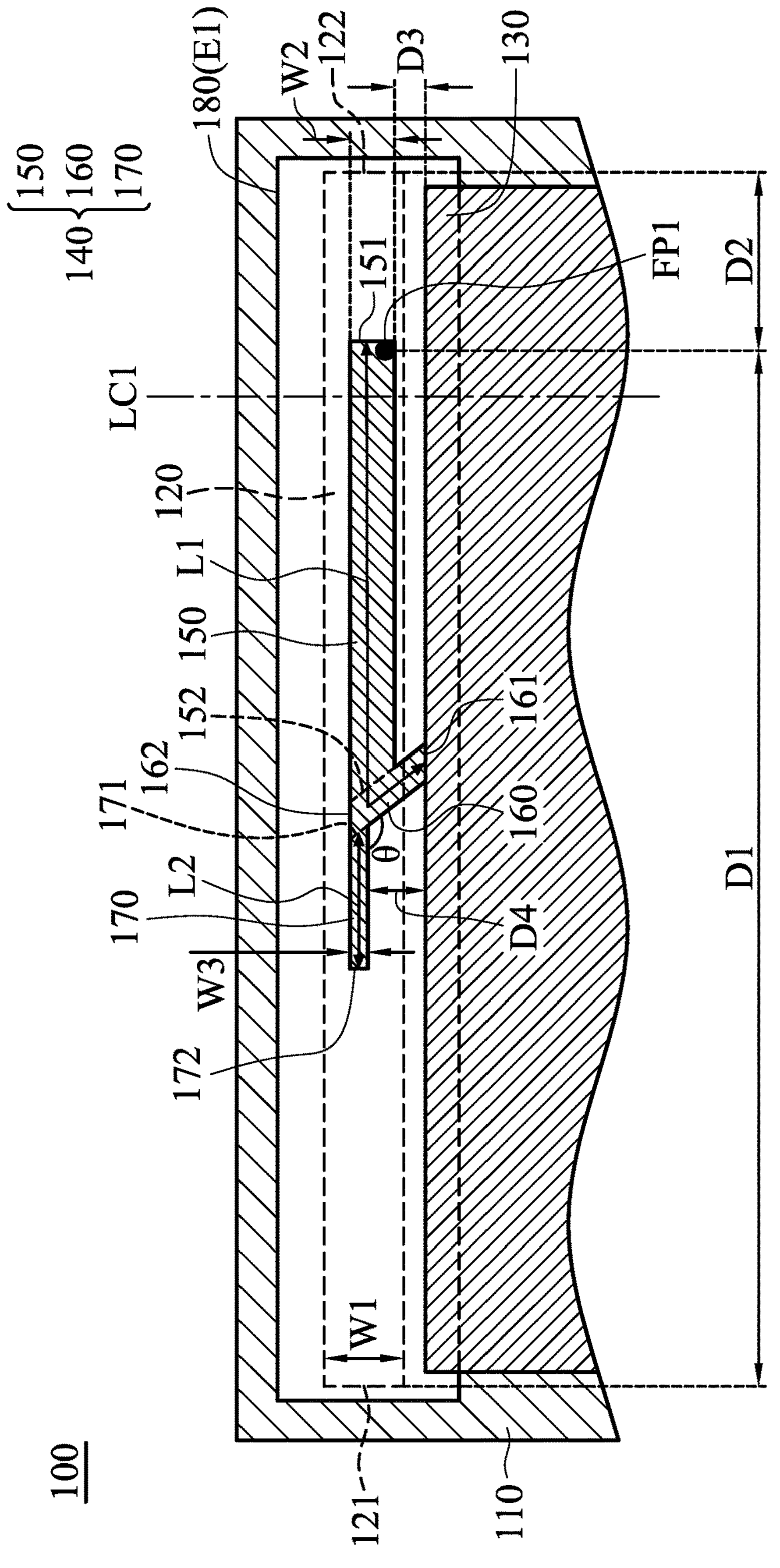
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
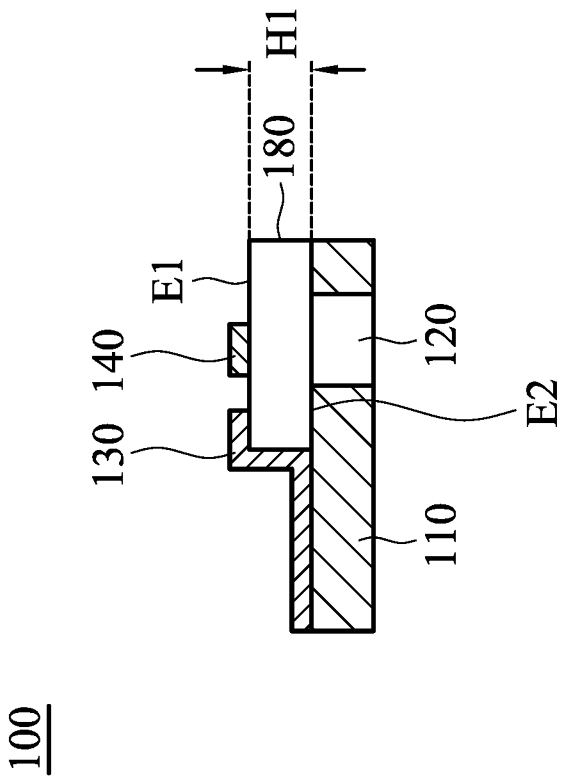
FIG. 2 is a sectional view of an antenna structure according to an embodiment of the invention.

FIG. 1 is a top view of an antenna structure 100 according to an embodiment of the invention. FIG. 2 is a sectional view of the antenna structure 100 according to an embodiment of the invention (along a sectional line LC1 of FIG. 1). Please refer to FIG. 1 and FIG. 2 together. The antenna structure 100 may be applied to a mobile device, such as a smart phone, a tablet computer, or a notebook computer. In the embodiment of FIG. 1 and FIG. 2, the antenna structure 100 includes a metal mechanism element 110, a ground element 130, a feeding radiation element 140, and a dielectric substrate 180. The ground element 130 and the feeding radiation element 140 may both be made of metal materials, such as copper, silver, aluminum, iron, or their alloys.

The metal mechanism element 110 may be a metal housing of a mobile device. In some embodiments, the metal mechanism element 110 is a metal upper cover of a notebook computer, or a metal back cover of a tablet computer, but it is not limited thereto. For example, if the mobile device is a notebook computer, the metal mechanism element 110 may be the so-called "A-component" in the field of notebook computers. The metal mechanism element 110 has a slot 120. The slot 120 of the metal mechanism element 110 may substantially have a straight-line shape. Specifically, the slot 120 has a first closed end 121 and a second closed end 122 which are away from each other. The antenna structure 100 may also include a nonconductive material which fills the slot 120 of the metal mechanism element 110, so as to achieve the waterproof or dustproof function.

The dielectric substrate 180 may be an FR4 (Flame Retardant 4) substrate, a PCB (Printed Circuit Board), or an FPC (Flexible Printed Circuit). The dielectric substrate 180 has a vertical projection on the metal mechanism element 110, and the vertical projection can cover the whole slot 120 of the metal mechanism element 110. The dielectric substrate 180 has a first surface E1 and a second surface E2 which are opposite to each other. The feeding radiation element 140 is disposed on the first surface E1 of the dielectric substrate 180. The second surface E2 of the dielectric substrate 180 is adjacent to the slot 120 of the metal mechanism element 110. It should be noted that the term "adjacent" or "close" over the disclosure means that the distance (spacing) between two corresponding elements is smaller than a predetermined distance (e.g., 5 mm or shorter), or means that the two corresponding elements directly touch each other (i.e., the aforementioned distance/spacing therebetween is reduced to 0). In some embodiments, the second surface E2 of the dielectric substrate 180 is directly attached to the metal mechanism element 110.

The ground element 130 may be a ground copper foil, which may be couple to the metal mechanism element 110. In some embodiments, the ground element 130 extends from the metal mechanism element 110 onto the first surface E1 of the dielectric substrate 180.

The feeding radiation element 140 may substantially have a T-shape, and its vertical projection can at least partially overlap the slot 120 of the metal mechanism element 110. The feeding radiation element 140 includes a first branch 150, a second branch 160, and a third branch 170. The first branch 150 and the third branch 170 are both coupled through the second branch 160 to the ground element 130. The first branch 150 may substantially have a wide straight-line shape, which may be substantially parallel to the ground element 130. Specifically, the first branch 150 has a first end 151 and a second end 152. A feeding point FP1 is positioned at the first end 151 of the first branch 150. The feeding point FP1 may be coupled to a signal source (not shown). For example, the aforementioned signal source may be an RF (Radio Frequency) module for exciting the antenna structure 100.

The second branch 160 may substantially have a parallelogram or a rectangular shape. Specifically, the second branch 160 has a first end 161 and a second end 162. The first end 161 of the second branch 160 is coupled to the ground element 130. The second end 162 of the second branch 160 is coupled to the second end 152 of the first branch 150. The third branch 170 may substantially have a narrow straight-line shape (narrower than the first branch 150), which may be substantially parallel to the ground element 130. Specifically, the third branch 170 has a first end 171 and a second end 172. The first end 171 of the third branch 170 is coupled to the second end 162 of the second branch 160. The second end 172 of the third branch 170 is an open end. The second end 172 of the third branch 170 and the first end 151 of the first branch 150 may substantially extend in opposite directions and away from each other. In some embodiments, the angle θ between the second branch 160 and the third branch 170 is from 90 to 180 degrees (e.g., about 120 degrees). However, the invention is not limited thereto. In another embodiment, the aforementioned angle θ is changed to be exactly 90 degrees, such that the second branch 160 and the third branch 170 are perpendicular to each other. It should be noted that the first branch 150 and the third branch 170 have vertical projections on the metal mechanism element 110, and the whole vertical projections are inside the slot 120.

Figure 3:
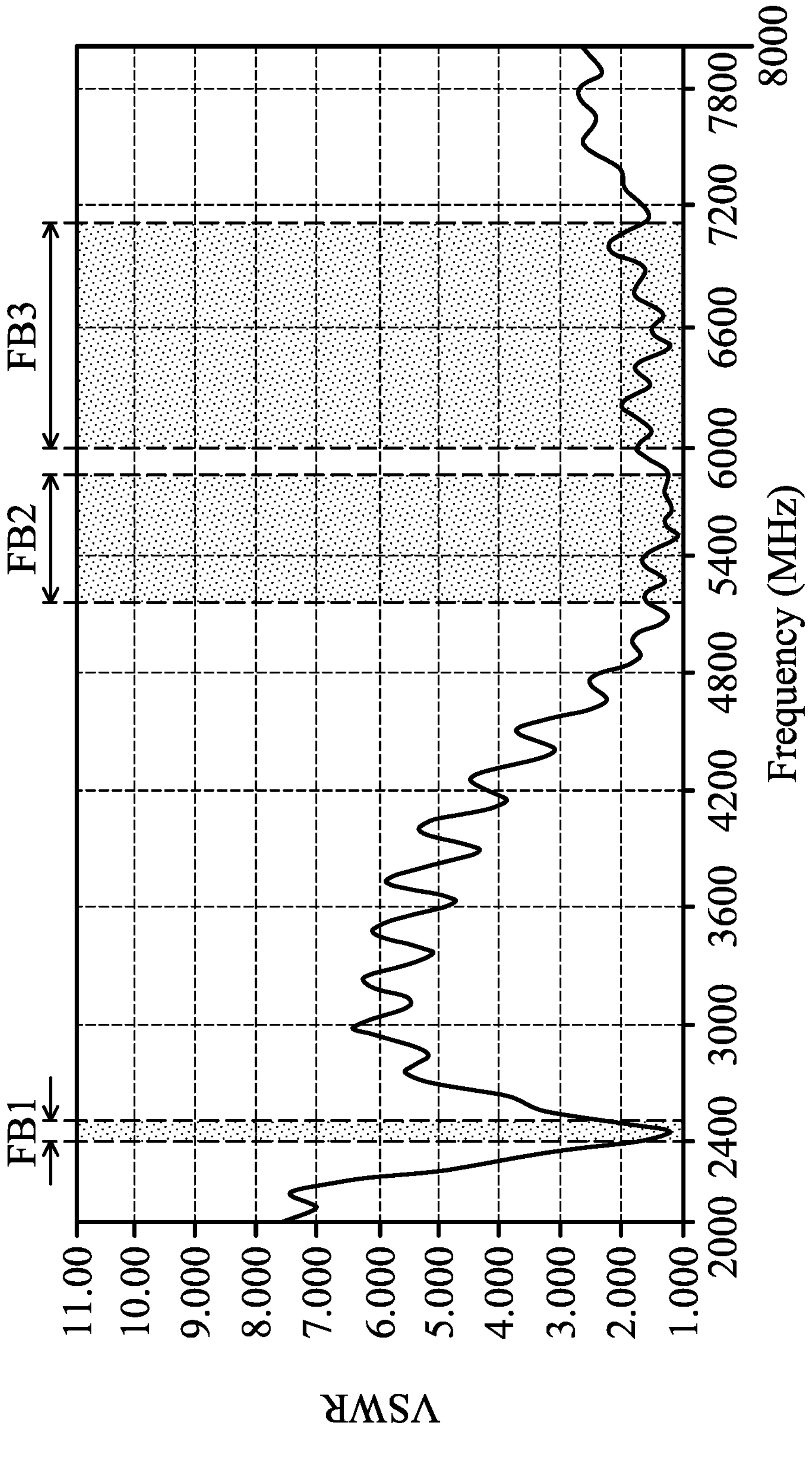
FIG. 3 is a diagram of VSWR (Voltage Standing Wave Ratio) of an antenna structure according to an embodiment of the invention.

FIG. 3 is a diagram of VSWR (Voltage Standing Wave Ratio) of the antenna structure 100 according to an embodiment of the invention. The horizontal axis represents operation frequency (MHz), and the vertical axis represents the VSWR. According to the measurement of FIG. 3, the antenna structure 100 covers a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 6000 MHz to 7125 MHz. Thus, the antenna structure 100 can support at least the wideband operations of the conventional WLAN (Wireless Local Area Network) 2.4 GHz/5 GHz and the next generation Wi-Fi 6E.

With respect to the antenna theory, the slot 120 of the metal mechanism element 110 can be excited by the feeding radiation element 140 using a coupling mechanism, so as to generate the first frequency band FB1 and the second frequency band FB2. The first branch 150 and the second branch 160 of the feeding radiation element 140 are excited to generate the third frequency band FB3. On the other hand, the third branch 170 of the feeding radiation element 140 is configured to fine-tune the impedance matching of the first frequency band FB1, the second frequency band FB2, and the third frequency band FB3. According to practical measurements, if the whole vertical projections of the first branch 150 and the third branch 170 of the feeding radiation element 140 are designed inside the slot 120, the operation bandwidth of the antenna structure 100 is effectively increased.

Figure 4:
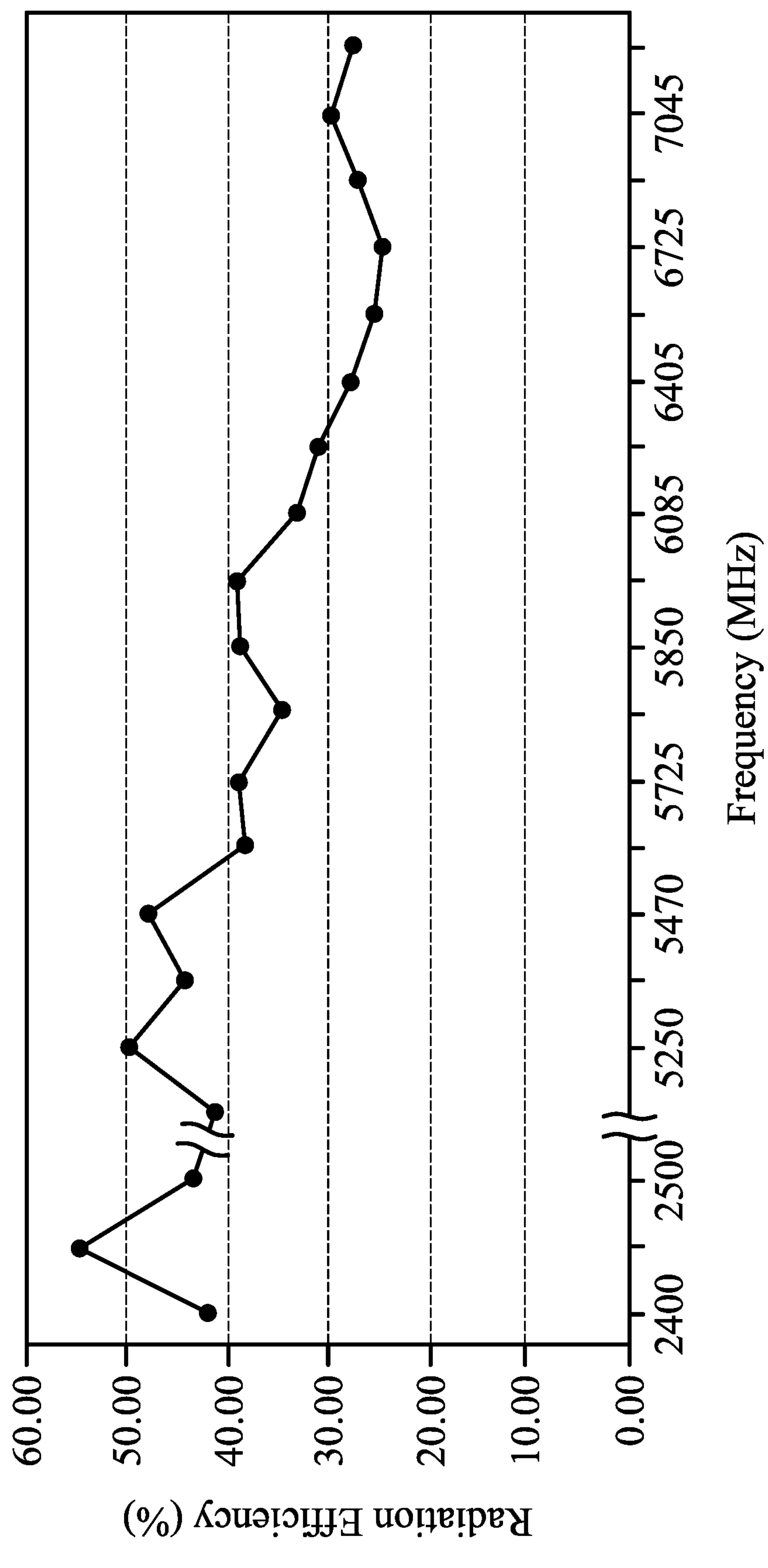
FIG. 4 is a diagram of radiation efficiency of an antenna structure according to an embodiment of the invention.

FIG. 4 is a diagram of radiation efficiency of the antenna structure 100 according to an embodiment of the invention. The horizontal axis represents operation frequency (MHz), and the vertical axis represents the radiation efficiency (%). According to the measurement of FIG. 4, the radiation efficiency of the antenna structure 100 is higher than 25% within the first frequency band FB1, the second frequency band FB2, and the third frequency band FB3. It can meet the requirements of practical application of general mobile communication devices.

In some embodiments, the sizes of the elements of the antenna structure 100 are as follows. The distance D1 between the feeding point FP1 and the first closed end 121 of the slot 120 may be from 0.25 to 0.5 wavelength (λ/4~λ/2) of the first frequency band FB1 of the antenna structure 100. The distance D2 between the feeding point FP1 and the second closed end 122 of the slot 120 may be from 0.25 to 0.5 wavelength (λ/4~λ/2) of the second frequency band FB2 of the antenna structure 100. The width W1 of the slot 120 may be from 2 mm to 3 mm. The total length L1 of the first branch 150 and the second branch 160 may from 0.25 to 0.5 wavelength (λ/4~λ/2) of the third frequency band FB3 of the antenna structure 100. The length L2 of the third branch 170 may be from 4 mm to 5 mm. The width W2 of the first branch 150 may be at least twice the width W3 of the third branch 170. The distance D3 between the first branch 150 and the ground element 130 may be from 1 mm to 1.5 mm. The distance D4 between the third branch 170 and the ground element 130 may be from 1.5 mm to 2 mm. The thickness H1 of the dielectric substrate 180 may be about 0.2 mm. The above ranges of element sizes are calculated and obtained according to many experiment results, and they help to optimize the operation bandwidth and impedance matching of the antenna structure 100.

Figure 5:
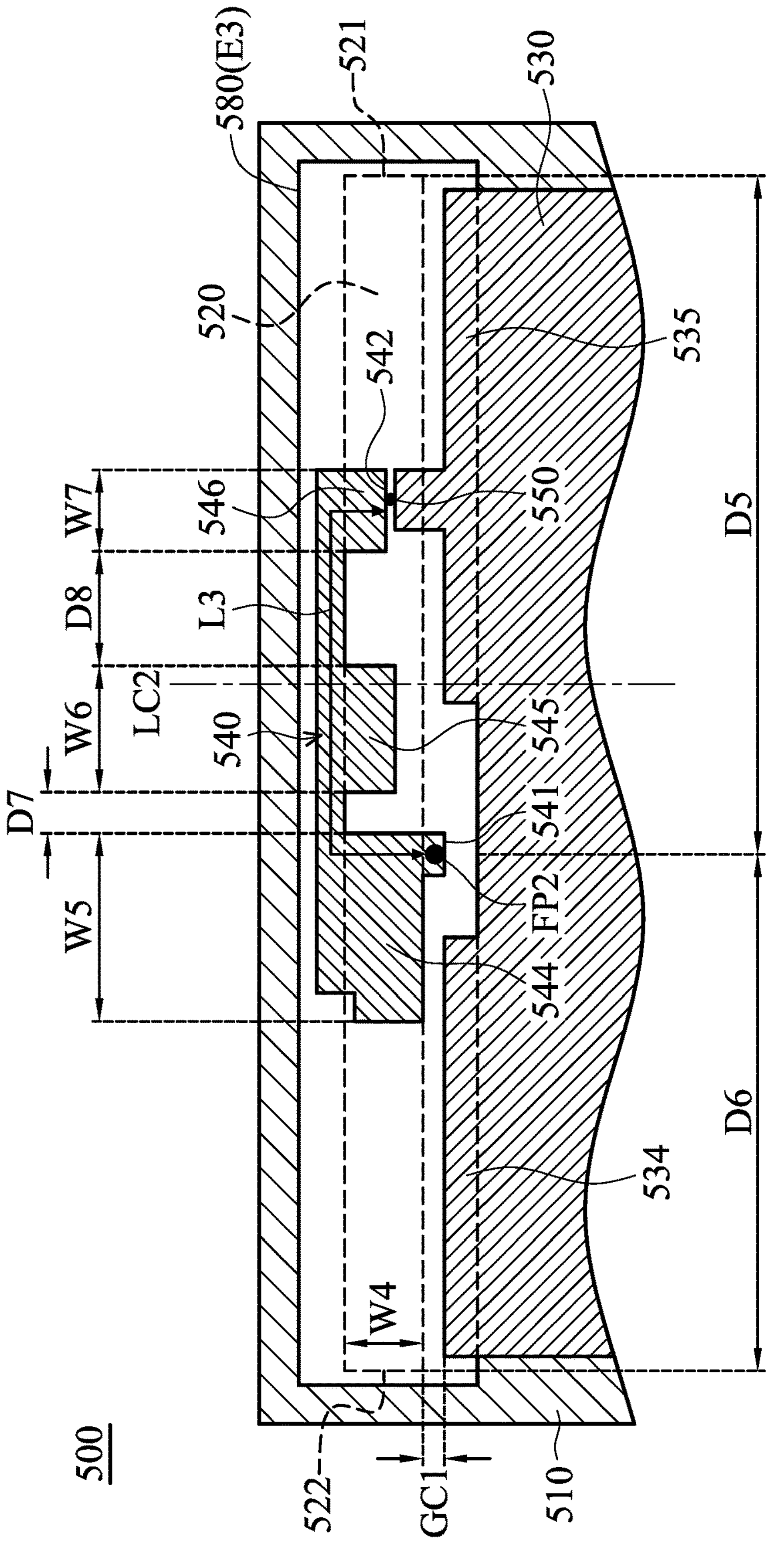
FIG. 5 is a top view of an antenna structure according to an embodiment of the invention.
Figure 6:
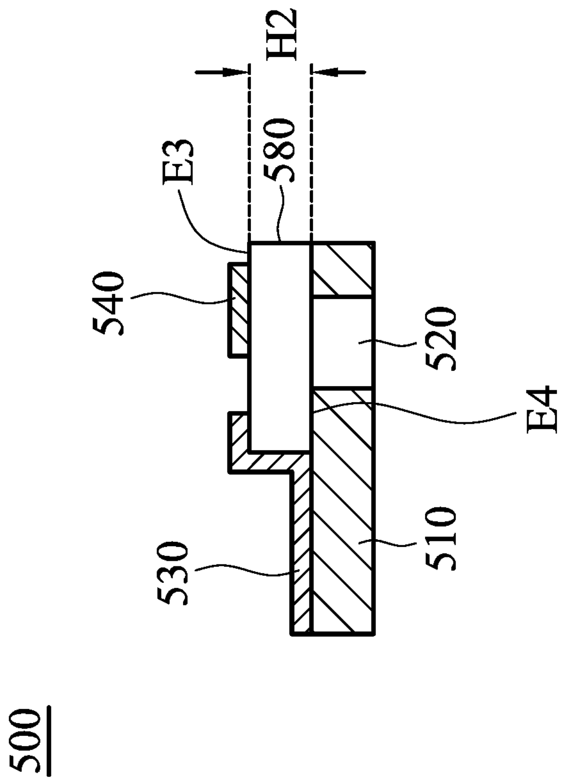
FIG. 6 is a sectional view of an antenna structure according to an embodiment of the invention.

FIG. 5 is a top view of an antenna structure 500 according to an embodiment of the invention. FIG. 6 is a sectional view of the antenna structure 500 according to an embodiment of the invention (along a sectional line LC2 of FIG. 5). Please refer to FIG. 5 and FIG. 6 together. In the embodiment of FIG. 5 and FIG. 6, the antenna structure 500 includes a metal mechanism element 510, a ground element 530, a feeding radiation element 540, and a dielectric substrate 580. The ground element 530 and the feeding radiation element 540 may both be made of metal materials.

The metal mechanism element 510 may be a metal housing of a mobile device. In some embodiments, the metal mechanism element 510 is a metal upper cover of a notebook computer, or a metal back cover of a tablet computer, but it is not limited thereto. The metal mechanism element 510 has a slot 520. The slot 520 of the metal mechanism element 510 may substantially have a straight-line shape. Specifically, the slot 520 has a first closed end 521 and a second closed end 522 which are away from each other. The antenna structure 500 may also include a nonconductive material which fills the slot 520 of the metal mechanism element 510, so as to achieve the waterproof or dustproof function.

The dielectric substrate 580 may be an FR4 substrate, a PCB, or an FPC. The dielectric substrate 580 has a vertical projection on the metal mechanism element 510, and the vertical projection can cover the whole slot 520 of the metal mechanism element 510. The dielectric substrate 580 has a first surface E3 and a second surface E4 which are opposite to each other. The feeding radiation element 540 is disposed on the first surface E3 of the dielectric substrate 580. The second surface E4 of the dielectric substrate 580 is adjacent to the slot 520 of the metal mechanism element 510. In some embodiments, the second surface E4 of the dielectric substrate 580 is directly attached to the metal mechanism element 510.

The ground element 530 may be a ground copper foil, which may be couple to the metal mechanism element 510. In some embodiments, the ground element 530 extends from the metal mechanism element 510 onto the first surface E3 of the dielectric substrate 580. Specifically, the ground element 530 further includes a first protruding portion 534 and a second protruding portion 535, which may be both disposed on the first surface E3 of the dielectric substrate 580. For example, the first protruding portion 534 of the ground element 530 may substantially have a straight-line shape, and the second protruding portion 535 of the ground element 530 may substantially have an inverted T-shape.

The feeding radiation element 540 may substantially have an M-shape, and its vertical projection can at least partially overlap the slot 520 of the metal mechanism element 510. Specifically, the feeding radiation element 540 has a first end 541 and a second end 542. A feeding point FP2 is positioned at the first end 541 of the feeding radiation element 540. The feeding point FP2 may be coupled to a signal source. For example, the aforementioned signal source may be an RF module for exciting the antenna structure 500. In some embodiments, the feeding radiation element 540 includes a first rectangular widening portion 544, a second rectangular widening portion 545, and a third rectangular widening portion 546. The first rectangular widening portion 544 is adjacent to the first protruding portion 534 of the ground element 530, such as a coupling gap GC1 is formed therebetween. In addition, the third rectangular widening portion 546 is positioned at the second end 542 of the feeding radiation element 540. The second rectangular widening portion 545 is positioned between the first rectangular widening portion 544 and the third rectangular widening portion 546. It should be noted that the first rectangular widening portion 544, the second rectangular widening portion 545, and the third rectangular widening portion 546 have vertical projections on the metal mechanism element 510, and the whole vertical projections are inside the slot 520. Furthermore, the feeding point FP2 may be positioned between the first protruding portion 534 and the second protruding portion 535 of the ground element 530.

In some embodiments, the antenna structure 500 further includes a circuit component 550. The circuit component 550 may be a fixed capacitor, a fixed inductor, or a fixed resistor. Alternatively, the circuit component 550 may be a variable capacitor, a variable inductor, or a variable resistor, whose impedance value is adjustable according to a control voltage of a processor. The third rectangular widening portion 546 of the feeding radiation element 540 may be further coupled through the circuit component 550 to the second protruding portion 535 of the ground element 530.

According to the practical measurement, the antenna structure 500 covers a first frequency band, a second frequency band, and a third frequency band. For example, the aforementioned first frequency band may be from 2400 MHz to 2500 MHz, the aforementioned second frequency band may be from 5150 MHz to 5850 MHz, and the aforementioned third frequency band may be from 6000 MHz to 7125 MHz. Thus, the antenna structure 500 can support at least the wideband operations of the conventional WLAN 2.4 GHz/5 GHz and the next generation Wi-Fi 6E.

With respect to the antenna theory, the slot 520 of the metal mechanism element 510 can be excited by the feeding radiation element 540 using a coupling mechanism, so as to generate the aforementioned first and second frequency bands. The feeding radiation element 540 is excited to generate the aforementioned third frequency band. According to practical measurements, the incorporation of the first rectangular widening portion 544, the second rectangular widening portion 545, and the third rectangular widening portion 546 can fine-tune the impedance matching of the aforementioned first, second and third frequency bands.

Moreover, the incorporation of the circuit component 550 can help to reduce the total size of the antenna structure 500.

In some embodiments, the sizes of the elements of the antenna structure 500 are as follows. The distance D5 between the feeding point FP2 and the first closed end 521 of the slot 520 may be from 0.25 to 0.5 wavelength (λ/4~λ/2) of the first frequency band of the antenna structure 500. The distance D6 between the feeding point FP2 and the second closed end 522 of the slot 520 may be from 0.25 to 0.5 wavelength (λ/4~λ/2) of the second frequency band of the antenna structure 500. The width W4 of the slot 520 may be from 2 mm to 3 mm. The length L3 of the feeding radiation element 540 may from 0.25 to 0.5 wavelength (λ/4~λ/2) of the third frequency band of the antenna structure 500. The width W5 of the first rectangular widening portion 544 may be greater than the width W6 of the second rectangular widening portion 545. The width W6 of the second rectangular widening portion 545 may be greater than the width W7 of the third rectangular widening portion 546. For example, the width W5 may be from 5 mm to 7 mm, the width W6 may be from 3 mm to 5 mm, and the width W7 may be from 2 mm to 3 mm. The distance D7 between the first rectangular widening portion 544 and the second rectangular widening portion 545 may be from 1 mm to 2 mm. The distance D8 between the second rectangular widening portion 545 and the third rectangular widening portion 546 may be from 3 mm to 4 mm. The width of the coupling gap GC1 may be smaller than 0.5 mm. The circuit component 550 may be a capacitor, whose capacitance may be from 0.1 pF to 2 pF, such as about 0.9 pF. The thickness H2 of the dielectric substrate 580 may be about 0.2 mm. The above ranges of element sizes are calculated and obtained according to many experiment results, and they help to optimize the operation bandwidth and impedance matching of the antenna structure 500.

The invention proposes a novel antenna structure for integrating with a metal mechanism element of a mobile device. In comparison to the conventional design, the invention has at least the advantages of small size, wide bandwidth, low manufacturing cost, and beautiful device appearance, and therefore it is suitable for application in a variety of mobile communication devices.

Note that the above element sizes, element shapes, element parameters, and frequency ranges are not limitations of the invention. An antenna designer can fine-tune these settings or values according to different requirements. It should be understood that the antenna structure of the invention is not limited to the configurations of FIGS. 1-6. The invention may merely include any one or more features of any one or more embodiments of FIGS. 1-6. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a metal mechanism element, having a slot, wherein the slot has a first closed end and a second closed end;

a ground element, coupled to the metal mechanism element;

a feeding radiation element, having a feeding point, wherein the feeding radiation element is coupled to the ground element; and a dielectric substrate, having a first surface and a second surface opposite to each other, wherein the feeding radiation element is disposed on the first surface, and the second surface is adjacent to the metal mechanism element;

wherein the slot of the metal mechanism element is excited to generate a first frequency band and a second frequency band, and the feeding radiation element is excited to generate a third frequency band;

wherein the ground element further comprises a first protruding portion and a second protruding portion;

wherein the feeding radiation element comprises a first rectangular widening portion, a second rectangular widening portion, and a third rectangular widening portion, and the first rectangular widening portion is adjacent to the first protruding portion of the ground element;

wherein the antenna structure further comprises:

a circuit component, wherein the third rectangular widening portion is coupled through the circuit component to the second protruding portion of the ground element.

2. The antenna structure as claimed in claim 1, wherein the first frequency band is from 2400 MHz to 2500 MHz, the second frequency band is from 5150 MHz to 5850 MHz, and the third frequency band is from 6000 MHz to 7125 MHz.

3. The antenna structure as claimed in claim 1, wherein a distance between the feeding point and the first closed end of the slot is from 0.25 to 0.5 wavelength of the first frequency band.

4. The antenna structure as claimed in claim 1, wherein a distance between the feeding point and the second closed end of the slot is from 0.25 to 0.5 wavelength of the second frequency band.

5. The antenna structure as claimed in claim 1, wherein the feeding radiation element substantially has an M-shape.

6. The antenna structure as claimed in claim 1, wherein a length of the feeding radiation element is from 0.25 to 0.5 wavelength of the third frequency band.

7. The antenna structure as claimed in claim 1, wherein the first protruding portion of the ground element substantially has a straight-line shape.

8. The antenna structure as claimed in claim 1, wherein the second protruding portion of the ground element substantially has an inverted T-shape.

9. The antenna structure as claimed in claim 1, wherein the first rectangular widening portion, the second rectangular widening portion, and the third rectangular widening portion have vertical projections on the metal mechanism element, and the vertical projections are inside the slot.

10. The antenna structure as claimed in claim 1, wherein the circuit component is a capacitor.

* * * * *